United States Patent
Cui et al.

(10) Patent No.: US 9,311,065 B2
(45) Date of Patent: Apr. 12, 2016

(54) DATA SPLITTING FOR MULTI-INSTANTIATED OBJECTS

(71) Applicant: International Business Machines Corporation, Armonk, NY (US)

(72) Inventors: Shimin Cui, Toronto (CA); Yan Zhang, Santa Clara, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/308,994

(22) Filed: Jun. 19, 2014

(65) Prior Publication Data

US 2015/0046913 A1 Feb. 12, 2015

(30) Foreign Application Priority Data

Jul. 9, 2013 (CA) ..................................... 2820230

(51) Int. Cl.
*G06F 9/45* (2006.01)
*G06F 12/02* (2006.01)

(52) U.S. Cl.
CPC .............. *G06F 8/443* (2013.01); *G06F 8/4442* (2013.01); *G06F 12/02* (2013.01)

(58) Field of Classification Search
CPC ........ G06F 8/443; G06F 8/4442; G06F 12/02
See application file for complete search history.

(56) References Cited

U.S. PATENT DOCUMENTS

| | | | | |
|---|---|---|---|---|
| 5,274,818 | A * | 12/1993 | Vasilevsky | G06F 8/443 717/149 |
| 5,943,691 | A * | 8/1999 | Wallace et al. | 711/172 |
| 6,449,747 | B2 * | 9/2002 | Wuytack | G06F 8/4442 716/135 |
| 6,539,541 | B1 * | 3/2003 | Geva | G06F 8/443 712/233 |
| 7,080,365 | B2 * | 7/2006 | Broughton | G06F 8/443 703/15 |
| 7,765,534 | B2 * | 7/2010 | Archambault | G06F 8/4442 717/144 |
| 7,856,627 | B2 * | 12/2010 | Archambault | G06F 8/443 717/151 |
| 8,015,556 | B2 | 9/2011 | Cui et al. | |
| 8,122,442 | B2 | 2/2012 | Lin | |
| 8,161,464 | B2 * | 4/2012 | Archambault | G06F 8/4442 717/140 |

(Continued)

OTHER PUBLICATIONS

Zhong et al., Array regrouping and structure splitting using whole-program reference affinity, [Online] 2004, In Proceedings of the ACM SIGPLAN 2004 conference on Programming language design and implementation (PLDI '04). ACM, New York, NY, USA, [Retrieved from the Internet] <http://doi.acm.org/10.1145/996841.996872> pp. 255-266.*

(Continued)

*Primary Examiner* — Thuy Dao
*Assistant Examiner* — Ravi K Sinha
(74) *Attorney, Agent, or Firm* — Cantor Colburn LLP; Edward Choi

(57) ABSTRACT

Embodiments relate to data splitting for multi-instantiated objects. An aspect includes receiving a portion of source code for compilation having a dynamic object to split using object size array data splitting. Another aspect includes replacing all memory allocations for the dynamic object with a total size of an object size array and object field arrays including a predetermined padding. Another aspect includes inserting statements in the source code after the memory allocations to populate the object size array with a value of a number of elements of the object size array. Another aspect includes updating a stride for load and store operations using dynamic pointers. Yet another aspect includes modifying field references by adding a distance between the object size array and the object field array to respective address operations.

20 Claims, 8 Drawing Sheets

(56) References Cited

U.S. PATENT DOCUMENTS

| | | | |
|---|---|---|---|
| 8,671,401 B2* | 3/2014 | Puri | G06F 8/4442 717/140 |
| 2001/0052106 A1* | 12/2001 | Wuytack | G06F 8/4442 716/135 |
| 2003/0188299 A1* | 10/2003 | Broughton | G06F 8/443 717/141 |
| 2005/0246700 A1* | 11/2005 | Archambault | G06F 8/4442 717/156 |
| 2007/0240137 A1* | 10/2007 | Archambault | G06F 8/4442 717/140 |
| 2008/0052693 A1* | 2/2008 | Archambault | G06F 8/443 717/151 |
| 2008/0091697 A1* | 4/2008 | Cui et al. | 707/101 |
| 2009/0019425 A1 | 1/2009 | Archambault et al. | |
| 2010/0192138 A1 | 7/2010 | Leung et al. | |
| 2011/0191549 A1* | 8/2011 | Lyutsarev | G06F 12/02 711/154 |
| 2013/0080698 A1* | 3/2013 | Raghunathan | 711/114 |
| 2014/0359241 A1* | 12/2014 | Dell | G06F 12/02 711/165 |
| 2015/0067268 A1* | 3/2015 | Barton et al. | 711/141 |

OTHER PUBLICATIONS

D. T. Harper and D. A. Linebarger, A dynamic storage scheme for conflict-free vector access, [Online] 1989, In Proceedings of the 16th annual international symposium on Computer architecture (ISCA '89). ACM, New York, NY, USA, [Retrieved from the Internet] <http://dx.doi.org/10.1145/74925.74934> pp. 72-77.*

Sudarsan, R.; Ribbens, C.J., ReSHAPE: A Framework for Dynamic Resizing and Scheduling of Homogeneous Applications in a Parallel Environment, [Online] Sep. 10-14, 2007, in Parallel Processing, 2007. ICPP 2007. International Conference on, [Retrieved from the Internt] <http://ieeexplore.ieee.org/stamp/stamp.jsp?tp=&arnumber=4343851&isnumber> 9 pages.*

Yosi Ben-Asher and Nadav Rotem, Automatic memory partitioning: increasing memory parallelism via data structure partitioning, [Online] 2010, In Proceedings of the eighth IEEE/ACM/IFIP international conference on Hardware/software codesign and system synthesis (CODES/ISSS '10), ACM, <http://dx.doi.org/10.1145/1878961.1878989> pp. 155-162.*

S. Curial, "Safe Automatic Data Splitting for Linked Data Structures," University of Alberta Library Release Form; Thesis paper; 2007; pp. 1-76.

S. Curial, et al., "MPADS: Memory-Pooling-Assisted Data Splitting," ISMM '08 Jun. 7-8, 2008, Tucson, AZ, USA; pp. 101-110.

P. Zhao, et al., "Forma: A Framework for Safe Automatic Array Reshaping," ACM Transactions on Programming Languages and Systems, vol. 30, No. 1, Article 2, Publication Date: Nov. 2007; pp. 1-30.

* cited by examiner

```
struct ABC {                     402
  int a;           404
  int b;           406
  ABC* c;          408
                              410
} *p, *q;                     412
                  414
init ( ) {
  p = malloc(N0 * sizeof(ABC));
  ……
  q = malloc(N1 * sizeof(ABC));
  ……
  for (i = 0; i < N0; ++i) {
    p->c = cond0 ? p : q++;
    p++;
  }
}
                      416
reinit () {
  while (cond1) {
    for (i = 0; i < N0; ++i) {
      …… = p[i].a + p[i].b;
    }
    ……
    p = realloc(p, N2 * sizeof(ABC));
  }
}                    418
```

MESSAGE/
DATA
412

Code
snippet
400

FIG. 4

```
                    502
                        504
int *p, *q;
#define Ea 1           506
#define Eb 2           508
#define Ec 3           510
#define Eall 4         512
define esize 4        514 init( ) {              516
  p = malloc(N0 * esize * Eall);
  for(i = 0; i < N0; ++i) p[i] = N0;
  ......
  q = malloc(N1 * esize * Eall);
  for(i = 0; i < N1; ++i) q[i] = N1;
  ......
  for (i = 0; i < N0; ++i) {
    int **c = (int **) (p + p[0] * Ec);
    *c = cond0 ? p : q++;
    p++;
  }
}
              518
reinit () {
  while (cond) {
    for (i = 0; i < N0; ++i) {
      int *a = (int*) (p + p[i] * Ea);
      int *b = (int*) (p + p[i] * Eb);
      // p[i] has the same value of p[0],
      // p[0] is invariant in the loop
        ...... = a[i] + b[i];
    }
    ......                              520
    p = split_realloc(p, N2 * esize * Eall);
    for(i = 0; i < N2; ++i) p[i] = N2;
  }
}
```

Code snippet 500

FIG. 5

DATA SPLITTING FOR MULTI-INSTANTIATED OBJECTS

PRIORITY

This application claims priority to Canadian Patent Application No. 2820230, filed Jul. 9, 2013, and all the benefits accruing therefrom under 35 U.S.C. §119, the contents of which in its entirety are herein incorporated by reference.

BACKGROUND

The present disclosure relates generally to data splitting in a data processing system and more specifically to data splitting for multi-instantiated objects in the presence of copy assignments with pointer offset operation in the data processing system.

Data splitting, as described in P. Zhao, S. Cui, Y. Gao, R. Silvera, and J. N. Amaral. *Forma: A Framework for Safe Automatic Array Reshaping*, ACM Transactions of Programming Languages, 30(1) 2007, is a proven effective compiler transformation to improve data locality and to reduce the memory footprint, resulting in better data cache efficiency. The transformation is particular useful in modern programs in which the dynamic memory allocation is widely used.

To ensure a safe code transformation, different data splitting mechanisms have been discussed for dynamically allocated objects depending on the code patterns of how the objects are allocated—whether the object is single instantiated or multiple instantiated. For a single instantiated object, there must be a single allocation point for the particular object type, and this point must be executed no more than once at run time. The base address of the object is therefore a constant at runtime. Therefore each field of an aggregated object can be split into a separate new object in which the base address is also constant at runtime.

For multiple instantiated objects, there may be more than one instantiation for a particular object type at program runtime. In cases where there is effectively a single instantiation for the object at program runtime, and when the compiler is unable to statically prove the memory allocation site is only executed no more than once, adopting the multi-instantiation data splitting mechanism for a safe code transformation is difficult.

Two methods proposed for data splitting in the presence of multiple object instantiations include a first method, which is an object descriptor technique on regular array objects, as is described in S. Cui and R. Silvera, Efficient Method of Data Reshaping for Multidimensional Dynamic Array Objects in the Presence of Multiple Object Instantiations, U.S. Pat. No. 8,015,556. For each object instantiation, an object descriptor is introduced to record information such as the base address and the current address of the objects. The object descriptor method can be applied to many programs with data splitting to improve the code performance. However, for some programs, the first method may become inefficient and might incur a significant increase in runtime of the program particularly when there are pointer assignments with pointer-offset operation in hot spots of the program. The inefficiency may occur because a copy of the object descriptor is created when there is a pointer assignment with pointer-offset operation, which implies the current address, may change for the candidate pointers. For example, a code snippet abstracted from a CPU2006 benchmark mcf (pbeampp.c) (available from www.spec.org, http://www.spec.org/cpu2006/index.html) is as follows:

```
for (act_t * arc = net->arcs ; arc < net->stop_arcs; arc += 1) {
    ......
    perm[basket_size++]->a = arc;
    ......
}
```

In the example, a compiler is able to determine a safe split for the object of arc in the whole program, but the runtime performance of the loop will suffer when the compiler applies the object descriptor technique due to inserting the copy of the object descriptor in the loop. Note that the compiler will consider the object of arc multiple instantiated and cannot determine the respective sizes at allocation time statically.

The second method is a memory pooling assisted data splitting technique on recursive data structures, for example, as is described in R. Archambault, S. Cui, S. Curial, Y. Gao, R. Silvera, and P. Zhao, Data Splitting for Recursive Data Structures, United States Patent Application Publication 2009/0019425. For each aggregated data type, a memory pool set is provided, which consists of one or more memory pool units, and the size of the memory pool units is determined constant for the same data type at compile time statically. This method reduces the addressing overhead in other splitting techniques since the address of each field is easily available at compile time. The drawback of the second method however is only the recursive data structures are handled and not multiple-instantiated objects with a size that cannot be determined at compile time.

Therefore, there is a need for an efficient method that allows compilers to apply data splitting for multi-instantiated objects in the presence of pointer assignments with pointer offset operation in programs to improve code performance.

SUMMARY

Methods, systems, and computer program products for data splitting for multi-instantiated objects are provided. An aspect includes receiving a portion of source code for compilation having a dynamic object to split using object size array data splitting. Another aspect includes replacing all memory allocations for the dynamic object with a total size of an object size array and object field arrays including a predetermined padding. Another aspect includes inserting statements in the source code after the memory allocations to populate the object size array with a value of a number of elements of the object size array. Another aspect includes updating a stride for load and store operations using dynamic pointers. Yet another aspect includes modifying field references by adding a distance between the object size array and the object field array to respective address operations.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

Various embodiments will now be described, by way of example only, with reference to the following drawings in which:

FIG. 4 is a textual representation of a code portion prior to array splitting used with the data splitting for multi-instantiated objects system of FIG. 3 in accordance with one embodiment of the disclosure;

FIG. 5 is a textual representation of the code portion of FIG. 4 after array splitting used with the data splitting for multi-instantiated objects system of FIG. 3 in accordance with one embodiment of the disclosure;

DETAILED DESCRIPTION

Figure 1:
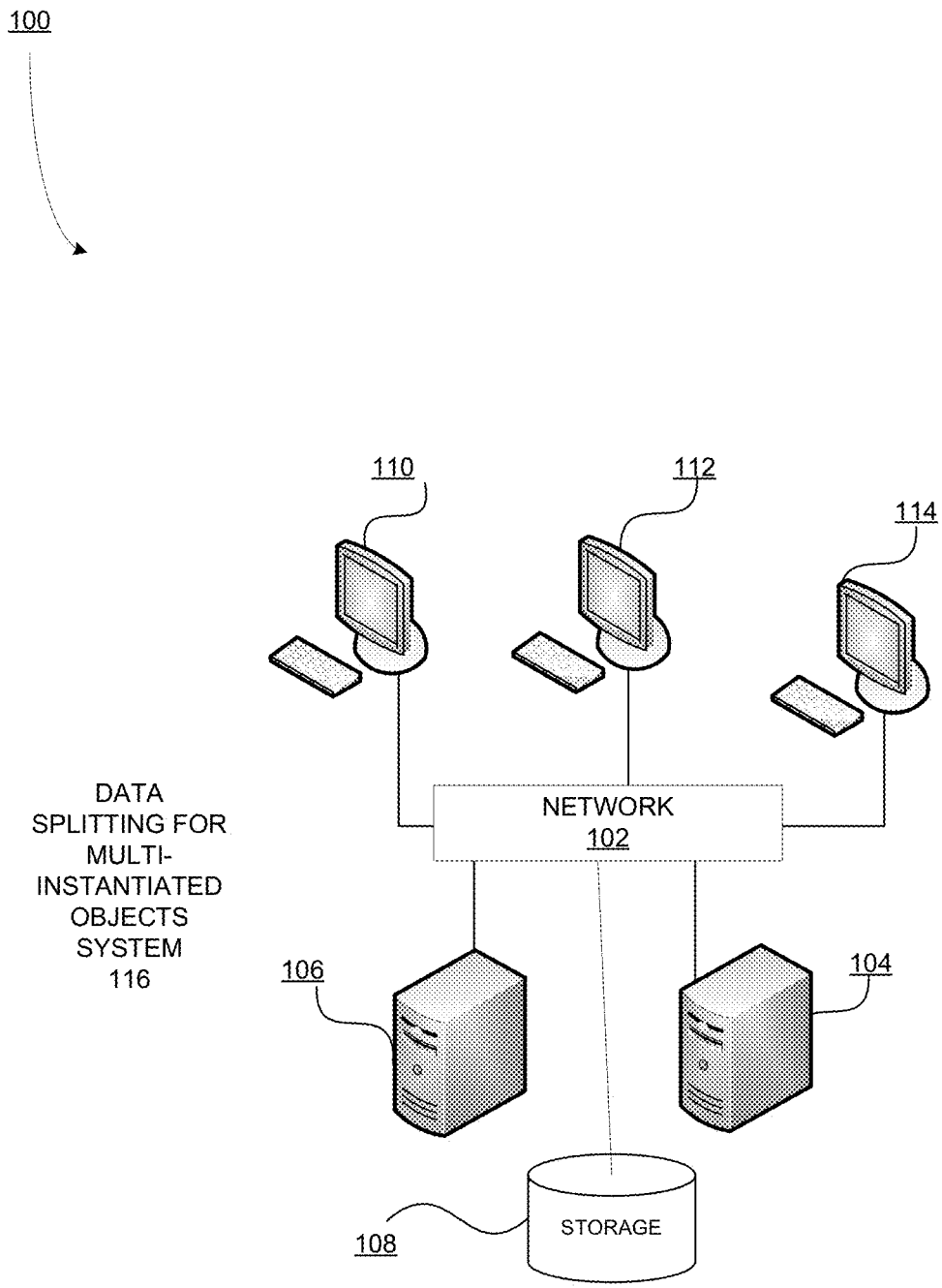
FIG. 1 is a block diagram of an exemplary network data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, some embodiments may take the form of a computer program product embodied in one or more computer readable storage devices, including one or more computer readable memories, having computer readable program code comprising computer executable instructions embodied thereon. The computer executable instructions when executed by one or more processors using the one or more computer readable storage devices, or the one or more computer readable memories directs the apparatus to perform the steps of a method represented in the computer executable instructions.

Any combination of one or more computer-readable data storage devices may be utilized. A computer-readable data storage device may be, for example, but not limited to, an electronic, magnetic, optical, or semiconductor system, apparatus, or device, or any suitable combination of the foregoing, but does not encompass propagation media. More specific examples (a non-exhaustive list) of the computer-readable data storage devices would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing, but does not encompass propagation media. In the context of this document, a computer-readable data storage device may be any tangible device that can store a program for use by or in connection with an instruction execution system, apparatus, or device.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle Corporation, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable data storage device that can direct a computer or other programmable data processing apparatus to function in a particular manner, such that the instructions stored in the computer readable data storage device produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
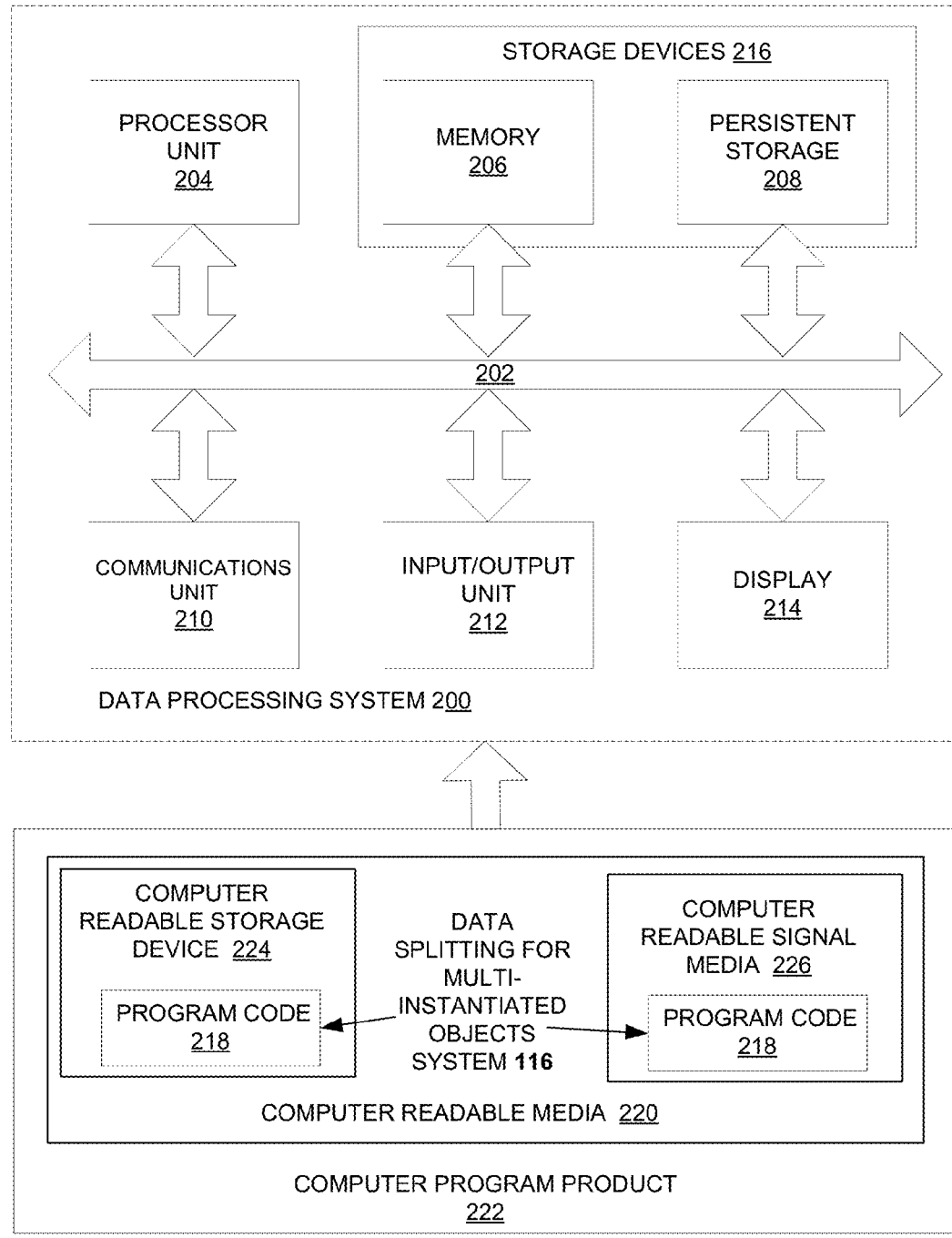
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, data splitting for multi-instantiated objects system 116 and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218, including code for data splitting for multi-instantiated objects system is located in a functional form on computer readable storage device 224 that is selectively removable and may be loaded onto or transferred to data processing system 200 for execution by processor unit 204. Program code 218 and computer readable storage device 224 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage device 224 also may take the form of a persistent storage, such as a hard drive, a thumb drive, or a flash memory that is connected to data processing system 200. The tangible form of computer readable storage device 224 is also referred to as computer recordable storage media or a computer readable data storage device. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples.

In some illustrative embodiments, program code 218 may be downloaded over a network to persistent storage 208 from another device or data processing system for use within data processing system 200. For instance, program code stored in a computer readable data storage device in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for data splitting for multi-instantiated objects is presented. Processor unit 204 receives a portion of source code for compilation having a dynamic object to split using object size array data splitting and replaces all memory allocations for the dynamic object with a total size of an object size array and object field arrays including a predetermined padding.

Processor unit 204 further inserts statements in the source code after the memory allocations to populate the object size array with a value of a number of elements of the object size array and updates a stride for load and store operations using dynamic pointers. Processor unit 204 further modifies field references by adding a distance between the object size array and the object field array to respective address operations.

Figure 3:
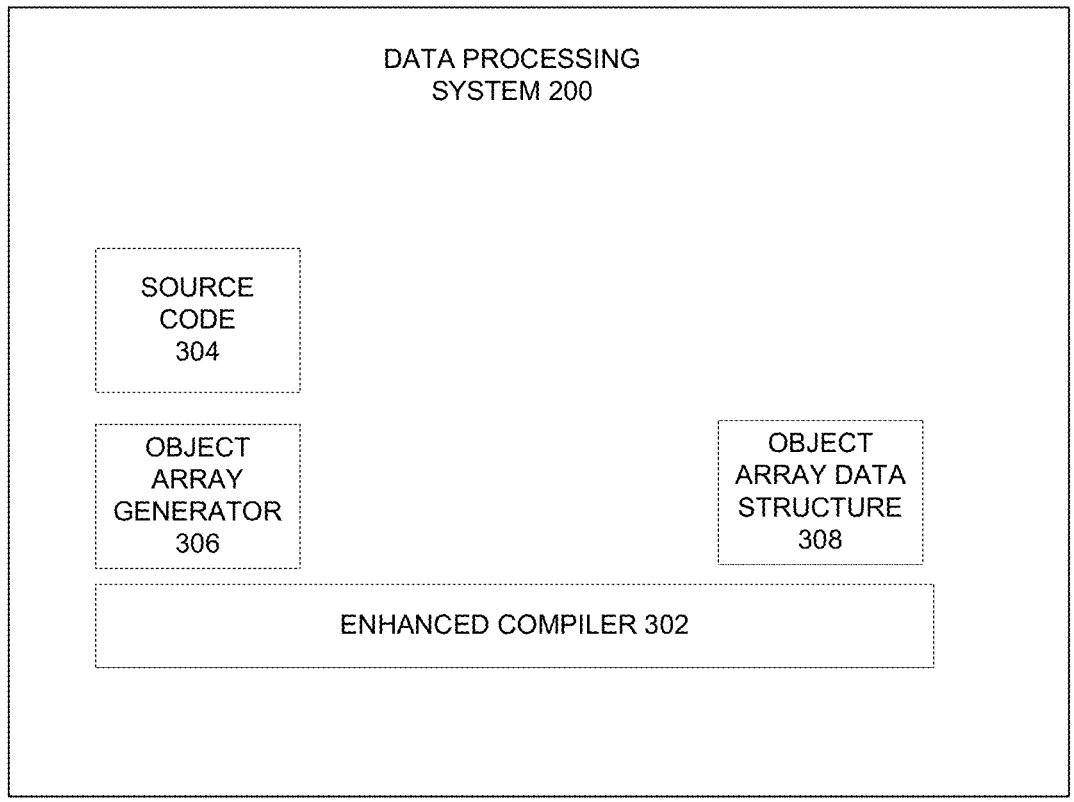
FIG. 3 is a block diagram representation of a data splitting for multi-instantiated objects system operable for various embodiments of the disclosure.

With reference to FIG. 3 a block diagram representation of a data splitting for multi-instantiated objects system operable for various embodiments of the disclosure is presented.

Data splitting for multi-instantiated objects system 300 leverages underlying support of a data processing system such as network data processing 100 of FIG. 1 or data processing system 200 of FIG. 2. One or more processors, such as processor unit 204 executes the computer executable program code of enhanced compiler 302 to receive a portion of source code 304 for compilation having a dynamic object to split using object size array data splitting. Enhanced compiler 302 emits optimized code from source code 304 using an optimization of array splitting as described in forthcoming portions.

Enhanced compiler 302 provides a capability of replacing all memory allocations for the dynamic object with a total size of an object size array and object field arrays including a predetermined padding. Enhanced compiler 302 further provides a capability of inserting statements in source code 304 after the memory allocations to populate the object size array with a value of a number of elements of the object size array and too update a stride for load and store operations using dynamic pointers. Enhanced compiler 302 further modifies field references by adding a distance between the object size array and the object field array to respective address operations.

Object array generator 306 (which may be implemented within enhanced compiler 302) provides a capability of creating object array structure 308 using source code 304 processed using enhanced compiler 302. Rather than a typical dynamic object array having a linear structure of elements, object array structure 308 may be more correctly described as a tabular structure comprising a base array, also referred to as object size array (or row) and one or more object field arrays (one row for each unique object (field).

An embodiment of the disclosed process provides an extension of existing data-splitting techniques to obtain cache locality for dynamically allocated objects. One embodiment of the disclosed process for data splitting for multi-instantiated objects, selects a candidate dynamic object for array splitting using interprocedural pointer analysis, interprocedural data shape analysis, and interprocedural data affinity analysis and determines whether the selected candidate dynamic object is single instantiated. Responsive to a determination that the selected candidate dynamic object is single instantiated, the embodiment further splits the dynamic object into separate arrays with base address constant at runtime. Responsive to a determination that the selected candidate dynamic object is not single instantiated, the embodiment further determines whether there are pointer assignments with pointer-offset operation for the selected candidate dynamic object.

Responsive to a determination that there are no pointer assignments with pointer-offset operation for the selected candidate dynamic object, the embodiment further splits the selected candidate dynamic object using an object descriptor method. Responsive to a determination that there are pointer assignments with pointer-offset operation for the selected candidate dynamic object, the embodiment further determines whether all fields in aggregate have a same size.

Responsive to a determination that all fields in aggregate do not have a same size, the embodiment further applies at least one of field grouping and padding according to an associated access pattern. Responsive to a determination that all fields in aggregate have a same size, the embodiment determines whether all memory allocation sizes at all allocation sites can be computed at a determined first runtime allocation site.

Responsive to a determination that all memory allocation sizes at all allocation sites can be computed at a determined first runtime allocation site, the embodiment splits the selected candidate dynamic object using a memory pooling assisted data splitting method. Responsive to a determination that all memory allocation sizes at all allocation sites cannot be computed at a determined first runtime allocation site, the embodiment splits the selected candidate dynamic object using an object size array method comprising steps of: replacing all memory allocations with a total size of the object size array and object field arrays and possible padding added; inserting statements after the memory allocations to populate the object size array with a value of a number of elements of the object size array; updating a stride for load and store operations of dynamic pointers; modifying field references by adding a distance between the object size array and the object field array to address operations; and performing a predetermined set of optimizations.

Embodiments of the disclosed process provide a novel data splitting method to reorganize dynamically allocated objects with multiple object instantiations to improve the runtime performance in the execution of the compiled code. Embodiments of the disclosed method are typically efficient when pointer assignments with pointer offset operation for the split objects in the hot spots of the program, for which the previous existing data splitting techniques are not suitable to apply to achieve code performance improvement. An extra object size array is introduced using the embodiment to record a number of elements of dynamic objects to enable safe code transformation while avoiding the copy overhead of pointer assignments introduced with the object descriptor method.

With reference to FIG. 4 a textual representation of a code portion prior to array splitting used with the data splitting for multi-instantiated objects system of FIG. 3 in accordance with one embodiment of the disclosure is presented. Code snippet 400 is an example representation of computer program code that is amenable to improvement by an embodiment of the disclosed array splitting method.

Code snippet 400 illustrates computer program code using a C programming language style suitable for optimization in compilation by an interprocedural compilation method. In the example of code snippet 400, variable p 410 and variable q 412 are global pointers to a type of structure struct ABC 402. Struct ABC 402 contains three fields in the form of field a 402, field b 404 and field c 406. Field a 402 and field b 404 are integers. Field c 406 is a pointer to the type of ABC. Both pointers p 410 and q 412 are dynamic. The object p 410 is initially allocated in function init 414 and reallocated 418 in function reinit 416. The object q 412 is allocated in function init 414. The field pointer c of p 410 may point to any part of the objects of p 410 or q 412.

With reference to FIG. 5 a textual representation of the code portion of FIG. 4 after array splitting used with the data splitting for multi-instantiated objects system of FIG. 3 in accordance with one embodiment of the disclosure is presented. Code snippet 500 is an example representing computer program code after an optimization operation of array splitting of code snippet 400.

Both pointers p 502 and q 504 are dynamic. The object p 502 is initially allocated in function init 516 and reallocated 520 in function reinit 518. The object q 504 is allocated in function init 516.

The three fields as in field a 402, field b 404 and field c 406 of code snippet 400 of FIG. 4 are replaced by an object size array defined in statements 512 and 514 and three object field arrays, defined in statements 506, 508 and 510.

Figure 6:
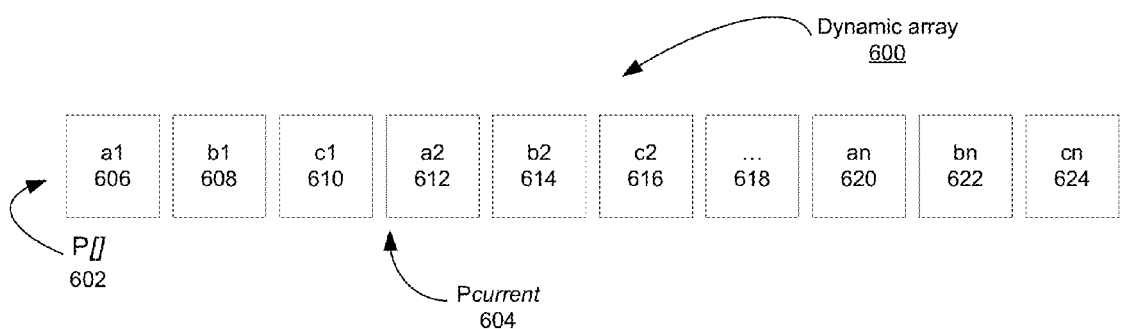
FIG. 6 is a block diagram of a dynamic array prior to array splitting in accordance with one embodiment of the disclosure.

With reference to FIG. 6 a block diagram of a dynamic array prior to array splitting in accordance with one embodiment of the disclosure is presented. Dynamic array 600 comprises a number of fields in sets comprising fields a1 606, b1 608, c1 610, set of fields a2 612, b2 614, c2 616, through additional set of fields 618 and ending with set of fields an 620, bn 622 and cn 624.

An initial pointer in the form of $p_{[\ ]}$ 602 is depicted as pointing to a first element in dynamic array 600. A current pointer in the form of $p_{current}$ 604 is depicted as pointing to a second element.

Figure 7:
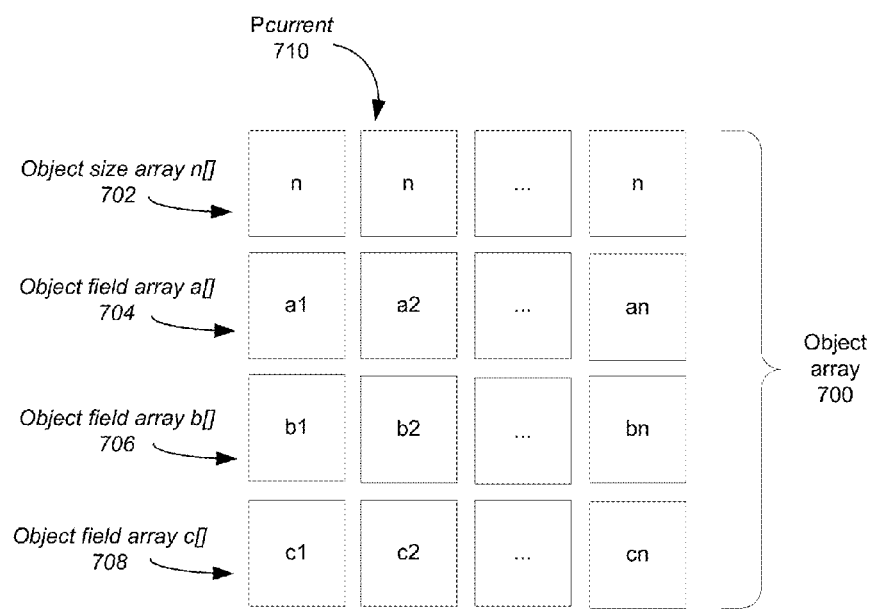
FIG. 7 is a block diagram of an object array after array splitting of the dynamic array of FIG. 6 using the data splitting for multi-instantiated objects system of FIG. 3 in accordance with one embodiment of the disclosure.

With reference to FIG. 7 is a block diagram of an object array after array splitting of the dynamic array of FIG. 6 using the data splitting for multi-instantiated objects system of FIG. 3 in accordance with one embodiment of the disclosure is presented.

Using the example of the object of FIG. 6, which is originally a dynamic array structure; assume all fields are of the same size. With maximal array splitting, the dynamic array is replaced by object array 700 comprising object size array n[ ] 702, and three object field arrays, object field array a[ ] 704, object field array b[ ] 706, and object field array c[ ] 708. Object size array n[ ] 702 is added for safe code transformation of array splitting with multiple object instantiations. Object size array n[ ] 702 contains the same number of elements as allocated for the dynamic objects, and each element is an integer having a value of the number of elements allocated for the dynamic object. The object field arrays of object field array a[ ] 704, object field array b[ ] 706, and object field array c[ ] 708 correspond to the three fields in the original dynamic object, and each field array also contains the same number of elements as allocated for the dynamic object.

Object size array n[ ] 702 assumes a role of the original array in the transformation. For example, assuming an original pointer points to a second element of the aggregated object (for example $p_{current}$ 604 of FIG. 6), the original pointer is replaced by a pointer $p_{current}$ 710 pointing to the second element of the base array (object size array n[ ] 702) after array splitting is performed.

For load and store operations of a dynamic pointer, the stride is updated when necessary, accordingly a stride update is zero or more iterations. Using the data splitting for multi-instantiated objects system of FIG. 3 is typically more efficient than the object descriptor method where a copy of the object descriptors is needed to accommodate when the current address may change.

The allocated memory area for the base array (object size array n[ ] 702) and the object field arrays (object field array a[ ] 704, object field array b[ ] 706, and object field array c[ ] 708) is contiguous after the array splitting. Using the disclosed array splitting, all memory allocations are replaced by an allocation with a total size of object size array n[ ] 702, the object field arrays of the example, object field array a[ ] 704, object field array b[ ] 706, and object field array c[ ] 708 and possible padding. Padding may be added for alignment or other purpose, for example, to reduce cache conflicts. Statements are further inserted to populate object size array n[ ] 702 with a value of the number of elements of object size array n[ ] 702. When performing memory reallocation, the memory block for each object field array needs to be moved to a respective location separately.

Object size array n[ ] 702 and each of object field array a[ ] 704, object field array b[ ] 706, and object field array c[ ] 708 are of the same length, because all fields are of the same length. Therefore, the fields in the same element of the aggregate object originally will have a fixed distance of a multiple of the size of the object size array after array splitting. To reference a field of the split object, the address of the field is generated by adding a fixed offset to the base with an updated stride. For example, the reference of p→b will become *((int*)(p+p[0]*2)), where the expression p[0]*2 is the fixed distance between object size array n[ ] 702 and object field array b[ ] 706.

With reference to the example of computer program code of FIG. 4 and resulting computer program code after array splitting as shown in FIG. 5, after array splitting is performed, other interprocedural or intra-procedural optimization techniques may be applied to further improve performance in execution of the compiled code. A particular transformation comprises invariant code motion of loading object size array elements in an address calculation using a property all the elements in the object size array have the same value of the element number of the base array. For example, using a reference of p[i].b, the address distance expression p[i]*2 can be changed to p[0]*2, which can be further moved out of the loop when the reference is in a loop and when p is invariant in the loop.

The disclosed method can also be applied in cases when not all fields in the aggregate data type are of a same length. One approach to resolve this case is to divide all fields in the data structure plus an integer base into groups wherein all groups are of the same size. Another approach is to add padding to the small fields to increase each respective size to the same length as the large fields.

In situations when a compiler can statically determine a first runtime allocation site and memory allocation sizes at all allocation sites at the first runtime allocation site, for example, when all memory allocation sizes are constant, the object size array may not be needed. Accordingly, an approach calculates a maximum size of all allocation sites, and allocates all field arrays with the calculated maximum size. Another approach, which typically provides a favorable result is to adopt the memory pooling, assisted data splitting method with a pool size set as a multiple of a maximum size of all the allocation sites.

Figure 8:
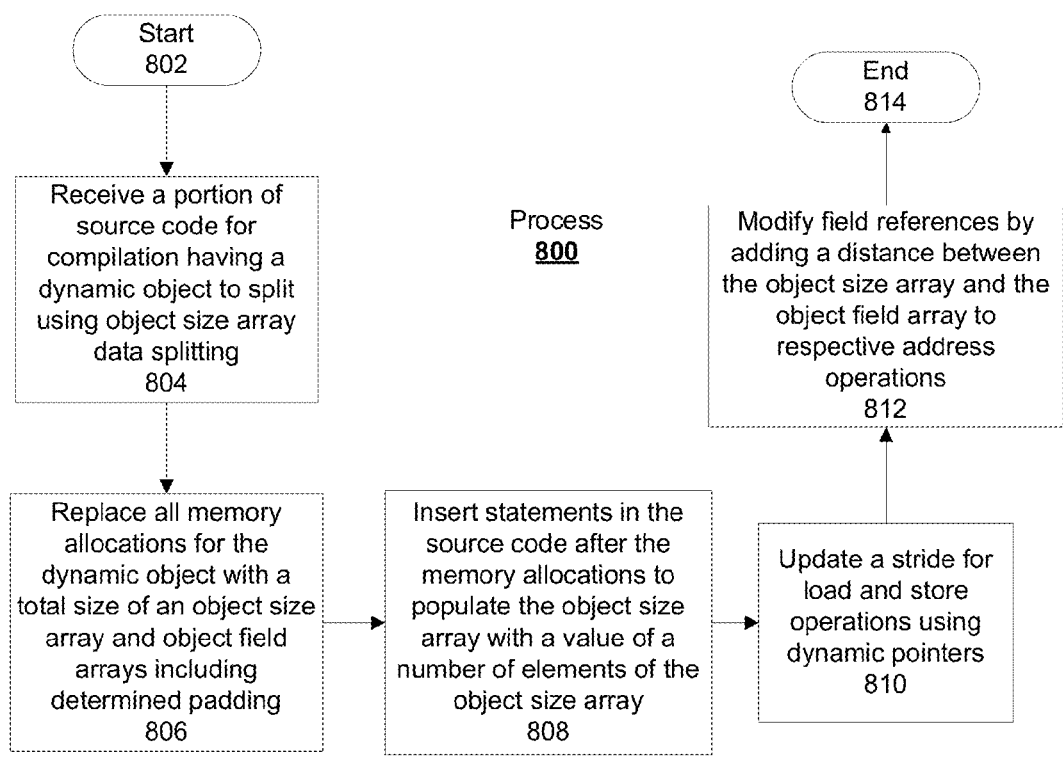
FIG. 8 is a flowchart of a process of array splitting using the data splitting for multi-instantiated objects system of FIG. 3 in accordance with one embodiment of the disclosure.

With reference to FIG. 8 a flowchart of a process of array splitting using the data splitting for multi-instantiated objects system of FIG. 3 in accordance with one embodiment of the disclosure is presented. Process 800 is an example of performing array splitting using the data splitting for multi-instantiated objects system 300 of FIG. 3.

Process 800 begins (step 802) and receives a portion of source code having a dynamic object to split using object size array data splitting (step 804). The portion of source code having a dynamic object to split using object size array data splitting was previously identified as a candidate for data splitting from among a number of dynamic objects. Analysis of dynamic objects to identify candidates for data splitting use any number of analysis methods including interprocedural pointer analysis, interprocedural data shape analysis and interprocedural data affinity analysis.

Process 800 replaces all memory allocations for the dynamic object with a total size of an object size array and object field arrays including determined padding (step 806). Padding increases a size of a particular field (a smaller field) to a size of a largest field (a larger field) so that each field has a uniform or same length. Each memory allocation when using the previous dynamic object is now replaced with a single allocation of a total size for object size array and object field arrays. The single allocation also ensures a contiguous memory block for the new object array structure.

Process 800 insert statements in the source code after the memory allocations to populate the object size array with a value of a number of elements of the object size array (step 808). The number of elements of the object size array is equal to the number of elements of the dynamic array for which splitting is performed.

Process 800 updates a stride for load and store operations using dynamic pointers (step 810). The new stride has the same value of the element size of the split array. Process 800 modifies field references by adding a distance between the object size array and the object field array to respective address operations (step 812) and terminates thereafter (step 814). The modification ensures proper addressing using a base array plus offset to correctly reference each respective element.

Figure 9:
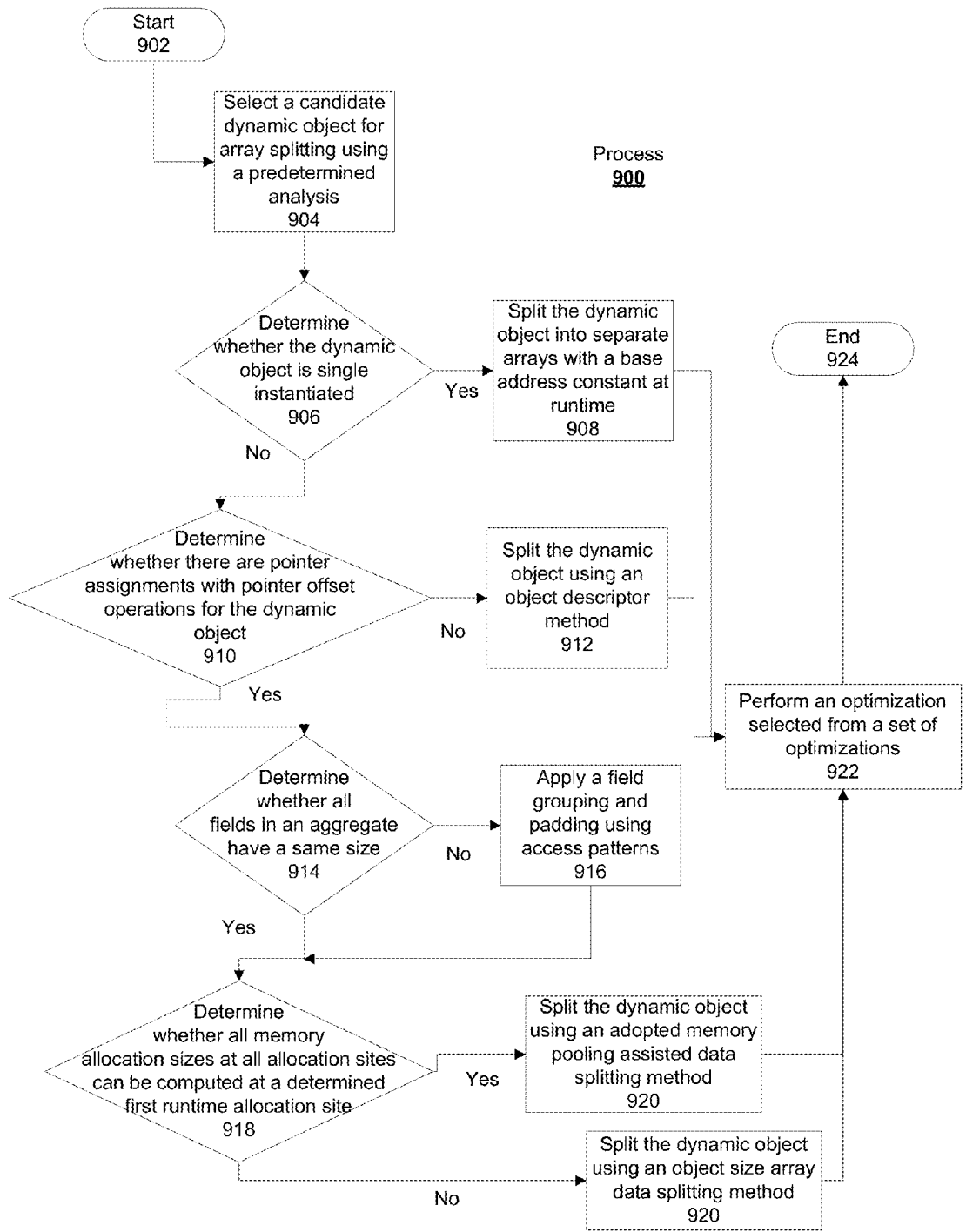
FIG. 9 is a flowchart of a process of array splitting using the data splitting for multi-instantiated objects system of FIG. 3 as an optimization in accordance with one embodiment of the disclosure.

With reference to FIG. 9 is a flowchart of a process of array splitting using the data splitting for multi-instantiated objects system of FIG. 3 as an optimization in accordance with one embodiment of the disclosure is presented. Process 900 is an example of performing array splitting using the data splitting for multi-instantiated objects system 300 of FIG. 3 as one of a set of optimizations.

Process 900 begins (step 902) and selects a candidate dynamic object for array splitting using one of a predetermined analysis (step 904). For example, an analysis of dynamic objects to identify candidates for data splitting uses any number of analysis methods including interprocedural pointer analysis, interprocedural data shape analysis and interprocedural data affinity analysis.

Process 900 determines whether the dynamic object is single instantiated (step 906). Responsive to a determination the dynamic object is single instantiated; process 900 splits the dynamic object into separate arrays with a base address constant at runtime (step 908). Process 900 performs one or more optimizations selected from a set of optimizations (step 920) terminating thereafter (step 924). The set of optimizations may contain optimizations including transformations, which are interprocedural, or intraprocedural including code motion and loop transforms.

Responsive to a determination the dynamic object is not single instantiated; process 900 determines whether there are pointer assignments with pointer-offset operations for the dynamic object (step 910). Responsive to a determination there are no pointer assignments with pointer offset operations for the dynamic object process 900 splits the dynamic object using an object descriptor method (step 912). Process 900 performs one or more optimizations selected from a set of optimizations (step 920) terminating thereafter (step 924) as before.

Responsive to a determination there are pointer assignments with pointer offset operations for the dynamic object process 900 determines whether all fields in aggregate have a same size (step 914). Responsive to a determination all fields in an aggregate have do not have a same size process 900 applies a field grouping and padding using access patterns (step 916). Padding may be added to particular fields (referred to as smaller fields) as a technique to build out to a uniform size of field (a field which is accordingly largest in size than a smaller field) to yield the uniform sizing. Responsive to a determination all fields in an aggregate have a same size process 900 determines whether all memory allocation sizes at all allocation sites can be computed at a determined first runtime allocation site (step 918).

Responsive to a determination all memory allocation sizes at all allocation sites can be computed at a determined first runtime allocation site process 900 splits the dynamic object using an adopted memory pooling assisted data splitting method (step 920). Process 900 performs one or more optimizations selected from a set of optimizations (step 920) terminating thereafter (step 924) as before.

Responsive to a determination all memory allocation sizes at all allocation sites cannot be computed at a determined first runtime allocation site process 900 splits the dynamic object using an object size array data splitting method (step 920). The dynamic object is split using an object size array data splitting method as in process 800 of FIG. 8. Process 900 performs one or more optimizations selected from a set of optimizations (step 920) terminating thereafter (step 924) as before.

Thus is presented in an illustrative embodiment a computer-implemented process for data splitting for multi-instantiated objects, comprising receiving a portion of source code for compilation having a dynamic object to split using object size array data splitting. The embodiment further replaces all memory allocations for the dynamic object with a total size of an object size array and object field arrays including a predetermined padding, inserts statements in the source code after the memory allocations to populate the object size array with a value of a number of elements of the object size array, updates a stride for load and store operations using dynamic pointers and modifies field references by adding a distance between the object size array and the object field array to respective address operations.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In an embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage device having computer executable instructions stored thereon in a variety of forms. Examples of computer readable data storage devices include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

It will be clear to one of ordinary skill in the art that all or part of the method of various embodiments may suitably and usefully be embodied in additional logic apparatus or additional logic apparatuses, comprising logic elements arranged to perform the steps of the method and that such logic elements may comprise additional hardware components, firmware components or a combination thereof.

It will be equally clear to one of skill in the art that some or all of the functional components of various embodiments may suitably be embodied in alternative logic apparatus or apparatuses comprising logic elements to perform equivalent functionality using equivalent method steps, and that such logic elements may comprise components such as logic gates in, for example a programmable logic array or application-specific integrated circuit. Such logic elements may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

Various embodiments may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infra-red or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infra-red, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Various embodiments may be realized in the form of a computer implemented method of deploying a service comprising steps of deploying computer program code operable to, when deployed into a computer infrastructure and executed thereon, cause the computer system to perform all the steps of the method.

Various embodiments may be realized in the form of a data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiment without departing from the scope of the present invention.

What is claimed is:

1. A computer-implemented process for data splitting for multi-instantiated objects, the computer-implemented process comprising:

receiving a portion of source code for compilation having a dynamic object to split using object size array data splitting;

replacing all memory allocations for the dynamic object with a total size of an object size array and a plurality of object field arrays;

inserting statements in the source code after the memory allocations to populate the object size array, such that each element of a plurality of elements of the object size array is a value that is equal to a number of elements in the object size array, and wherein each of the object size array and the plurality of object field arrays comprises the same number of elements;

updating a stride for load and store operations using dynamic pointers; and modifying field references by adding a distance between the object size array and an object field array of the plurality of object field arrays to respective address operations.

2. The computer-implemented process of claim 1 wherein receiving a portion of source code for compilation having a dynamic object to split using object size array data splitting further comprises:

selecting a candidate dynamic object for array splitting using a predetermined analysis wherein the predetermined analysis is selected from a group comprising interprocedural pointer analysis, interprocedural data shape analysis and interprocedural data affinity analysis.

3. The computer-implemented process of claim 1 wherein receiving a portion of source code for compilation having a dynamic object to split using object size array data splitting further comprises:

determining whether the dynamic object is single instantiated;

responsive to a determination the dynamic object is not single instantiated, determining whether there are pointer assignments with pointer-offset operations for the dynamic object;

responsive to a determination there are pointer assignments with pointer offset operations for the dynamic object, determining whether all fields in an aggregate have a same size;

responsive to a determination all fields in an aggregate have a same size, determining whether all memory allocation sizes at all allocation sites can be computed at a determined first runtime allocation site; and responsive to a determination all memory allocation sizes at all allocation sites cannot be computed at a determined first runtime allocation site determining the portion of source code for compilation has a dynamic object to split using object size array data splitting.

4. The computer-implemented process of claim 1 further comprising performing an optimization selected from a set of optimizations.

5. The computer-implemented process of claim 1 wherein replacing all memory allocations for the dynamic object with a total size of an object size array and the plurality of object field arrays further comprises:

dividing all fields in a data structure plus an integer base into groups wherein all groups are of the same size; and adding padding to small fields to increase each respective size to a same length as larger fields.

6. The computer-implemented process of claim 1 wherein replacing all memory allocations for the dynamic object with a total size of an object size array and the plurality of object field arrays further comprises:

allocating memory in a single allocation to form a contiguous memory for a new object array structure, wherein the contiguous memory provides cache locality for the dynamic object.

7. The computer-implemented process of claim 1 wherein inserting statements in the source code after the memory allocations to populate the object size array with a value of a number of elements of the object size array further comprises wherein the number of elements of the object size array is equal to a number of elements of a dynamic array for which splitting is performed.

8. A computer program product for searching source code, the computer program product comprising a non-transitory computer readable medium having computer-readable program code embodied therewith, which when executed by a computer processor, causes the computer processor to implement:

receiving a portion of source code for compilation having a dynamic object to split using object size array data splitting;

replacing all memory allocations for the dynamic object with a total size of an object size array and a plurality of object field arrays;

inserting statements in the source code after the memory allocations to populate the object size array, such that each element of a plurality of elements of the object size array is a value that is equal to a number of elements in the object size array, and wherein each of the object size array and the plurality of object field arrays comprises the same number of elements;

updating a stride for load and store operations using dynamic pointers; and modifying field references by adding a distance between the object size array and an object field array of the plurality of object field arrays to respective address operations.

9. The computer program product of claim 8 wherein receiving a portion of source code for compilation having a dynamic object to split using object size array data splitting further comprises:

selecting a candidate dynamic object for array splitting using a predetermined analysis wherein the predetermined analysis is selected from a group comprising interprocedural pointer analysis, interprocedural data shape analysis and interprocedural data affinity analysis.

10. The computer program product of claim 8 wherein receiving a portion of source code for compilation having a dynamic object to split using object size array data splitting further comprises:

determining whether the dynamic object is single instantiated;

responsive to a determination the dynamic object is not single instantiated, determining whether there are pointer assignments with pointer-offset operations for the dynamic object;

responsive to a determination there are pointer assignments with pointer offset operations for the dynamic object, determining whether all fields in an aggregate have a same size;

responsive to a determination all fields in an aggregate have a same size, determining whether all memory allocation sizes at all allocation sites can be computed at a determined first runtime allocation site; and responsive to a determination all memory allocation sizes at all allocation sites cannot be computed at a determined first runtime allocation site determining the portion of source code for compilation has a dynamic object to split using object size array data splitting.

11. The computer program product of claim 8 further comprising performing an optimization selected from a set of optimizations.

12. The computer program product of claim 8 wherein replacing all memory allocations for the dynamic object with a total size of an object size array and the plurality of object field arrays further comprises:
dividing all fields in a data structure plus an integer base into groups wherein all groups are of the same size; and
adding padding to small fields to increase each respective size to a same length as larger fields.

13. The computer program product of claim 8 wherein replacing all memory allocations for the dynamic object with a total size of an object size array and the plurality of object field arrays further comprises:
allocating memory in a single allocation to form a contiguous memory for a new object array structure, wherein the contiguous memory provides cache locality for the dynamic object.

14. The computer program product of claim 8 wherein inserting statements in the source code after the memory allocations to populate the object size array with a value of a number of elements of the object size array further comprises wherein the number of elements of the object size array is equal to a number of elements of a dynamic array for which splitting is performed.

15. An apparatus for data splitting for multi-instantiated objects, the apparatus comprising:
a communications fabric;
a memory connected to the communications fabric, wherein the memory contains computer executable program code;
a communications unit connected to the communications fabric;
an input/output unit connected to the communications fabric;
a display connected to the communications fabric; and
a processor unit connected to the communications fabric, wherein the processor unit executes the computer executable program code to direct the apparatus to:
receive a portion of source code for compilation having a dynamic object to split using object size array data splitting;
replace all memory allocations for the dynamic object with a total size of an object size array and a plurality of object field arrays;
inserting statements in the source code after the memory allocations to populate the object size array, such that each element of a plurality of elements of the object size array is a value that is equal to a number of elements in the object size array, and wherein each of the object size array and the plurality of object field arrays comprises the same number of elements;
update a stride for load and store operations using dynamic pointers; and
modifying field references by adding a distance between the object size array and an object field array of the plurality of object field arrays to respective address operations.

16. The apparatus of claim 15 wherein the processor unit executes the computer executable program code to receive a portion of source code for compilation having a dynamic object to split using object size array data splitting further directs the apparatus to:
select a candidate dynamic object for array splitting using a predetermined analysis wherein the predetermined analysis is selected from a group comprising interprocedural pointer analysis, interprocedural data shape analysis and interprocedural data affinity analysis.

17. The apparatus of claim 15 wherein the processor unit executes the computer executable program code to receive a portion of source code for compilation having a dynamic object to split using object size array data splitting further directs the apparatus to:
determine whether the dynamic object is single instantiated;
responsive to a determination the dynamic object is not single instantiated, determine whether there are pointer assignments with pointer-offset operations for the dynamic object;
responsive to a determination there are pointer assignments with pointer offset operations for the dynamic object, determine whether all fields in an aggregate have a same size; and
responsive to a determination all fields in an aggregate have a same size, determine whether all memory allocation sizes at all allocation sites can be computed at a determined first runtime allocation site; and
responsive to a determination all memory allocation sizes at all allocation sites cannot be computed at a determined first runtime allocation site, determine the portion of source code for compilation has a dynamic object to split using object size array data splitting.

18. The apparatus of claim 15 wherein the processor unit executes the computer executable program code to replace all memory allocations for the dynamic object a total size of an object size array and the plurality of object field arrays further directs the apparatus to:
divide all fields in a data structure plus an integer base into groups wherein all groups are of the same size; and
add padding to small fields to increase each respective size to a same length as larger fields.

19. The apparatus of claim 15 wherein the processor unit executes the computer executable program code to replace all memory allocations for the dynamic object with a total size of an object size array and the plurality of object field arrays further directs the apparatus to:
allocate memory in a single allocation to form a contiguous memory for a new object array structure, wherein the contiguous memory provides cache locality for the dynamic object.

20. The apparatus of claim 15 wherein the processor unit executes the computer executable program code to insert statements in the source code after the memory allocations to populate the object size array with a value of a number of elements of the object size array further comprises wherein the number of elements of the object size array is equal to a number of elements of a dynamic array for which splitting is performed.

* * * * *